(12) United States Patent  (10) Patent No.: US 6,542,446 B1
Kim  (45) Date of Patent: Apr. 1, 2003

(54) OPTICAL DISC, AND OPTICAL DISC ACCESSING APPARATUS CAPABLE OF SECURING PICKUP TO BASE

(75) Inventor: Jin Yong Kim, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 09/667,590

(22) Filed: Sep. 22, 2000

(30) Foreign Application Priority Data

Sep. 22, 1999 (KR) .............................................. 99-40990

(51) Int. Cl.7 .............................................. G11B 21/08
(52) U.S. Cl. ............................... 369/30.12; 369/30.27; 369/33.01
(58) Field of Search ........................... 369/30.12, 30.27, 369/30.1, 30.11, 30.13, 30.14, 33.01

(56) References Cited

U.S. PATENT DOCUMENTS 5,537,387 A * 7/1996 Ando et al. ............... 369/275.1
5,754,521 A * 5/1998 Yokota ..................... 369/275.3
5,778,257 A * 7/1998 Tsukatani et al. ............. 710/74
6,229,784 B1 * 5/2001 Yoshimoto et al. ....... 369/275.3
6,310,854 B1 * 10/2001 Sato et al. ................ 369/275.3

FOREIGN PATENT DOCUMENTS

| JP | 1-130328 A | * | 5/1989 | ............. 369/30.12 |
| JP | 4-13266 A | * | 1/1992 | ............. 369/30.12 |
| KR | 1997-60158 | | 8/1997 | |
| KR | 1999-18762 | | 3/1999 | |

* cited by examiner

Primary Examiner—Tan Dinh
(74) Attorney, Agent, or Firm—Birch, Stewart, Kolasch & Birch, LLP

(57) ABSTRACT

A portable optical disc apparatus made into a slim-type apparatus and an optical disc adapted for the portable optical disc apparatus are disclosed. In the portable optical disc apparatus, a pickup is secured onto a base, and a movable member in the pickup is operated to access only an area within a specific radius range that is a partial area of the optical disc.

21 Claims, 4 Drawing Sheets

OPTICAL DISC, AND OPTICAL DISC ACCESSING APPARATUS CAPABLE OF SECURING PICKUP TO BASE

FIELD OF THE INVENTION

This invention relates to an optical disc apparatus, and more particularly to a portable optical disc apparatus easy to be made into a thin-type apparatus. The present invention also is directed to an optical disc suitable for the portable optical disc apparatus.

DESCRIPTION OF THE RELATED ART

Nowadays, there has been a development ro transform the existent CD and DVD, etc. into a magneto-optical disc exploiting both a light and a magnetic field and a near field optical disc expected to increase dramatically a recording density using a near field. Hereinafter, an optical disc generally includes all the recording media or storage media taking the above-mentioned disc type.

The optical disc is provided with signal tracks having a spiral shape or concentric circle shape, and trends toward a high density disc owing to a development of an access technique and a servo technique, etc. Accordingly, the optical disc is developed more and more small in size from a standard disc having a 12 cm diameter until a disc having a 8 cm diameter to be suitable for a portable equipment is reached.

Generally, an optical disc apparatus includes an optical pickup for optically accessing the optical disc, a spindle motor for rotating the optical disc, and a printed circuit board mounted with various circuitry such as drive and control circuits, an interface circuit and the like. Such an optical disc has been commercially available for peripheral equipment of a personal computer (PC) and an audio/video equipment. Recently, there has been suggested a scheme of using an optical disc having a large recording density as a storage medium of a portable equipment as various portable equipment, such as a notebook computer and a camcoder, etc. Accordingly, a study as to a high-density optical disc as well as a thin-type optical disc apparatus has been actively made.

Referring to FIG. 1, an optical disc apparatus includes a spindle motor 2 loaded with an optical disc 1, an optical pickup 3 for irradiating a light onto the optical disc 1, an optical pickup carriage motor 4 for carrying the optical pickup 3, and a sled base 5 for supporting the spindle motor 2 and the optical pickup carriage motor 4. The spindle motor 2 plays a role to rotary-drive the optical disc 1 at a constant speed. The optical pickup 3 consists of a laser light source and an optical system, and focuses a laser light beam emitted from the laser light source onto the optical disc 1 and converts a reflective light beam reflected from the optical disc 1 into an electrical signal. The optical pickup carriage motor 4 drives the optical pickup 3 via a guide shaft 4a. The optical pickup carriage motor 4 carries the optical pickup 3 in a radial direction of the optical disc 1 such that the optical pickup 3 can access the optical disc 1 on a random basis from the inner circumference thereof until the outer circumference thereof along the radial direction of the optical disc 1. At this time, the guide shaft 4a converts a rotation power generated from the optical pickup carriage motor 4 into a liner power to transfer the same to the optical pickup 3. The sled base 5 is installed, via a connecting member 5a, within the case 6 and plays a role to support the spindle motor 2 and the optical pickup carriage motor 4.

As shown in FIG. 2, for the sake of making a servo control, the optical disc apparatus includes a signal processor 7 connected to an output line of the optical pickup 3, a servo driver 8 for driving the optical pickup 3 and the optical pickup carriage motor 4, and a controller 9 for controlling the signal processor 7 and the servo driver 8. The signal processor 7 detects a radio frequency signal and servo control signals, such as focusing and tracking error signals, etc., from an output signal of the optical pickup 3. The servo driver 8 is connected between the signal processor 7 and the controller 9 to drive an actuator 3b attached with an objective lens 3a of the optical pickup 3 and the optical pickup carriage motor 4 in accordance with the servo error signals detected from the signal processor 7. With the aid of the servo driver 8, the optical pickup 3 retrieves a data in a rough search mode and in a fine search mode. In the rough search mode, the optical pickup carriage motor 4 is driven in a movement range exceeding a movable range of the actuator 3b. Thus, the entire optical pickup 3 is transferred in a radial direction of the optical disc 1 along the guide shaft 4a in the rough search mode. At this time, the signal processor 7 detects a tracking traverse signal being generated when the optical pickup 3 traverses the optical pickups. By monitoring this tracking traverse signal, the servo driver 8 moves the optical pickup 3 into a start point of the fine search mode. The start point of the fine search mode is determined by the rough search mode. In the fine search mode, the actuator 3b is driven in two, i.e., vertical and horizontal axes direction in accordance with a tracking error signal and a focusing error signal detected within a movable range of the actuator 3b. In the fine search mode, the objective lens 3a is driven with the actuator 3b to be moved into a final target position. The movable range of the actuator 3b, that is, the fine search allowable range is approximately hundreds through thousands of tracks.

However, the conventional optical pickup apparatus has a limit in making it into a slim-type apparatus due to optical pickup transfer devices, such as the optical pickup carriage motor 4 and the guide shaft 4a, and a space occupied by the sled base 5 for supporting these devices. Also, the optical pickup transfer devices and the sled base 5 transfer themselves vibration, or an external impact or vibration transferred from the exterior thereof to the optical pickup 3 to cause an external interference and vibration of the optical pickup 3. If the optical pickup 3 is vibrated upon recording and reproducing, then an error may be generated in a recording data or a reproducing data.

SUMMARY OF THE INVENTION

Accordingly, it is an object of the present invention to provide a portable optical disc apparatus that is easy to be made into a slim-type apparatus.

A further object of the present invention is to provide an optical disc adaptive for the portable optical disc apparatus.

In order to achieve this and other objects of the invention, an optical pickup apparatus according to one aspect of the present invention has a pickup secured onto a base, and a movable member in the pickup operated to access only an area within a specific radius range which is a partial area of the optical disc.

A optical disc according to another aspect of the present invention has a diameter equal to a standard or conventional optical disc and a data area thereof divided into at least two zones so that it can be used with optical disc apparatuses having different accessible radius ranges, and is provided with an identification information for the divided data area.

BRIEF DESCRIPTION OF THE DRAWINGS

This and other objects of the invention will be apparent from the following detailed description of the embodiments of the present invention with reference to the accompanying drawings, in which.

DETAILED DESCRIPTION OF THE PREFERRED EMBODIMENTS

Figure 1:
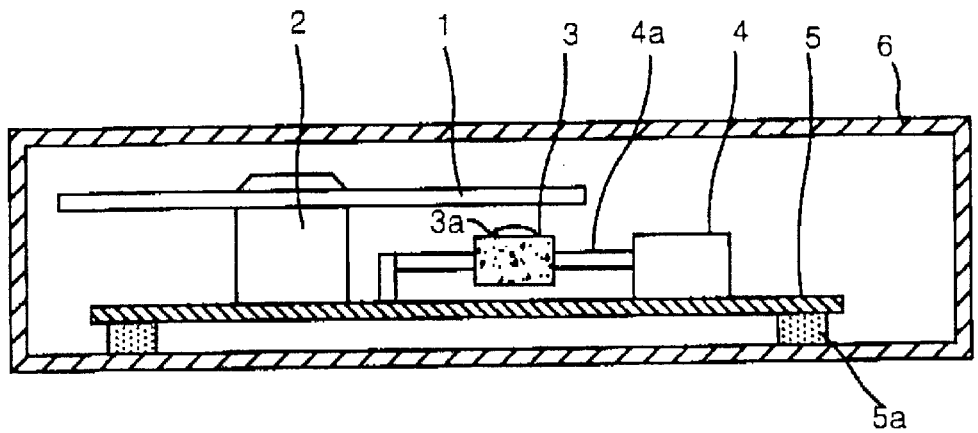
FIG. 1 is a schematic section view showing a structure of a conventional optical disc apparatus.
Figure 2:
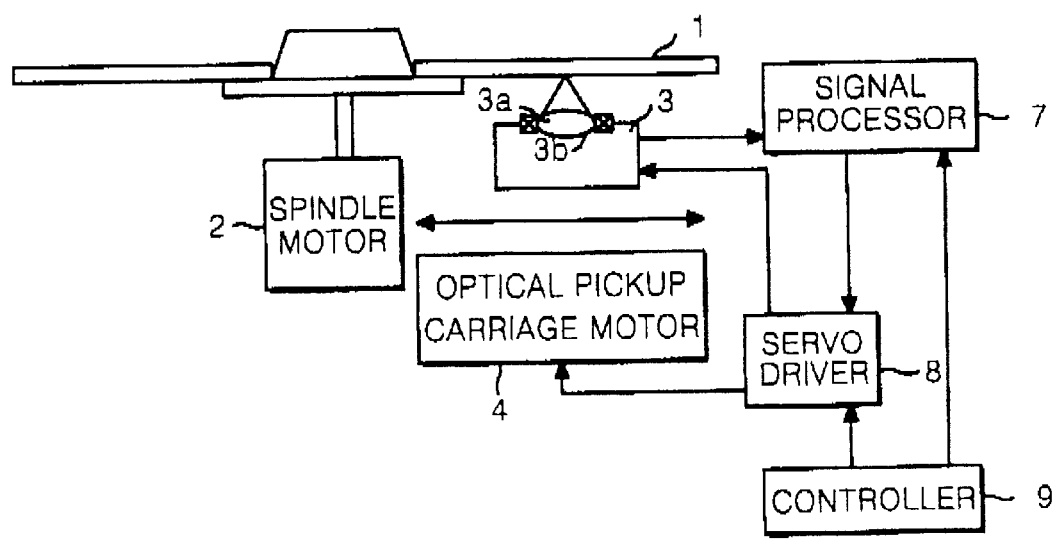
FIG. 2 is a block diagram showing a configuration of the servo driver in the optical pickup apparatus of FIG. 1.
Figure 3:
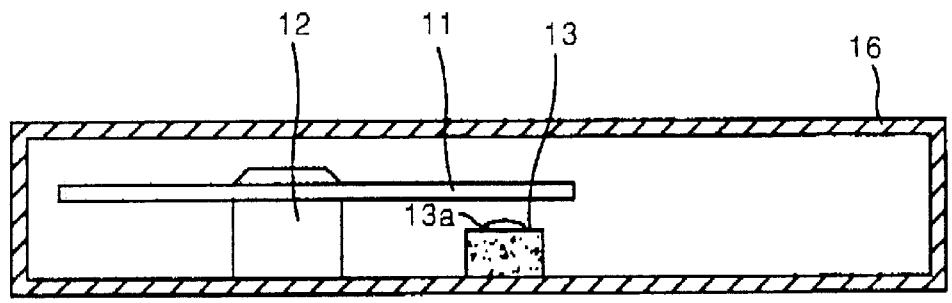
FIG. 3 is a schematic section view showing a structure of a portable optical pickup apparatus according to an embodiment of the present invention.

Referring to FIG. 3, there is shown a portable optical disc apparatus according to an embodiment of the present invention that includes an optical pickup 13 secured onto an case 16. The optical pickup 13 is secured onto the case 16 to search an optical disc 11 in the fine search mode, thereby recording or reproducing data. In other words, the optical pickup 13 accesses only an area within a specific radius range where the fine search is available in a recordable/reproducible area existing in the optical disc 11. A spindle motor 12 is secured onto the case 16 like the optical pickup 13 to rotate the optical disc 11 at a constant speed.

Since the optical pickup 13 is in a secured state, the optical pickup transfer devices such as the optical pickup carriage motor 4 and the guide shaft 4a, etc. of conventional devices are not needed and are not present. Accordingly, the present portable optical disc apparatus assures an extra space corresponding to a space occupied by the optical pickup transfer devices and the sled base 5, so that it can be made into a slim-type apparatus as seen from the drawing.

Figure 4:
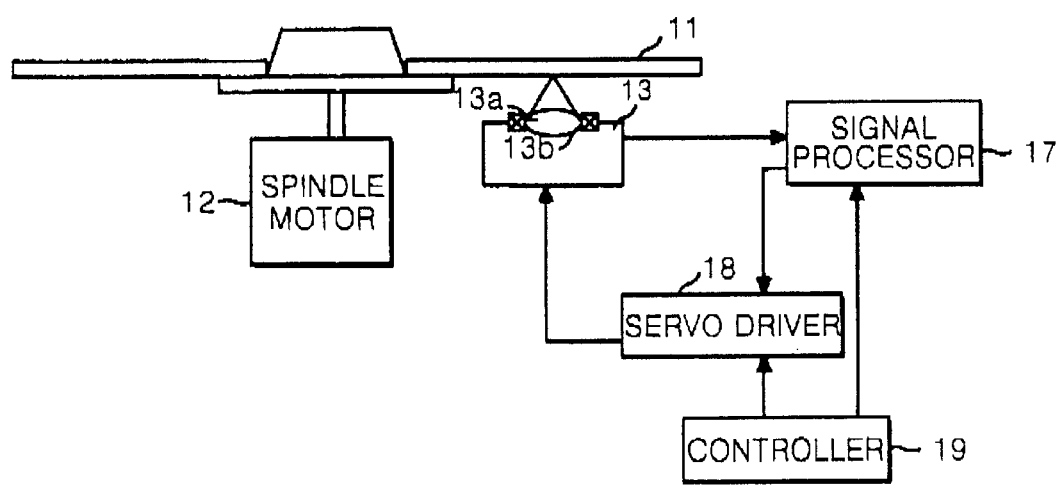
FIG. 4 is a block diagram showing a configuration of the servo driver in the optical pickup apparatus of FIG. 3.

For the sake of making a servo control, as shown in FIG. 4, the present portable optical disc apparatus includes a signal processor 17 connected to an output line of the optical pickup 13, a servo driver 18 for driving an actuator 13b of the optical pickup 13, and a controller 19 for controlling the signal processor 17 and the servo driver 18. The signal processor 17 detects a radio frequency signal and servo error signals, such as focusing and tracking error signals, etc., from an output signal of the optical pickup 13. The servo driver 18 drives the actuator 13b attached with an objective lens 13a of the optical pickup 13 in accordance with the servo error signals detected from the signal processor 17. In other words, when a track error signal or a focusing error signal is detected from the signal processor 17, the servo driver 18 drives the actuator 13b in a horizontal or vertical axis direction in accordance with the error range. As a result, the optical pickup 13 can stably record or reproduce data in the fine search mode or other modes.

An optical disc 11 according to an embodiment of the present invention is accessed changeably in both an optical disc apparatus of conventional fixed-type information equipment such as a personal computer and the portable optical disc apparatus as shown in FIG. 3. In other words, the entire recordable/reproducible area of the optical disc 11 can be accessed by the optical disc apparatus of the conventional fixed-type information equipment, whereas only an area within a specific radius range is accessed by the portable optical disc apparatus as shown in FIG. 3 according to the present invention. To this end, the optical disc 11 has a different position in a lead-in area in accordance with an area accessible by the portable optical disc apparatus as shown in FIG. 3.

Figure 5:
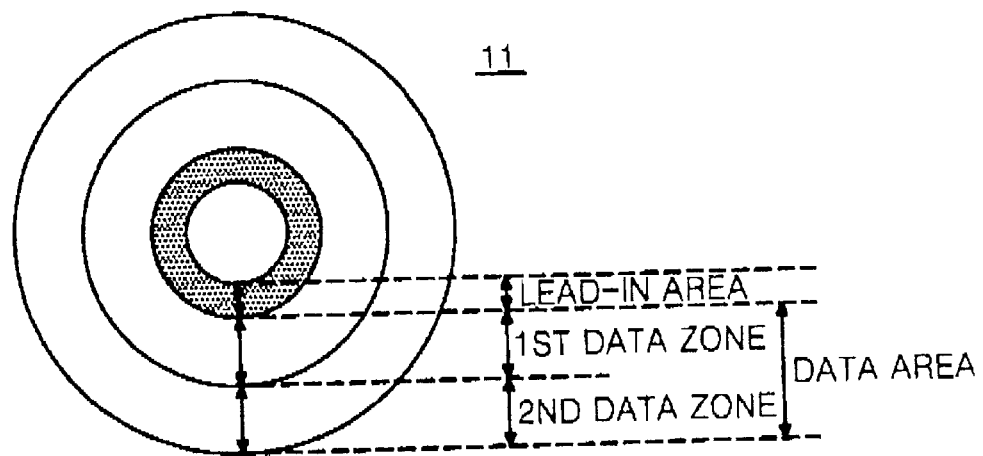
FIG. 5 is a plan view of an embodiment of the optical disc shown in FIG. 3.
Figure 6:
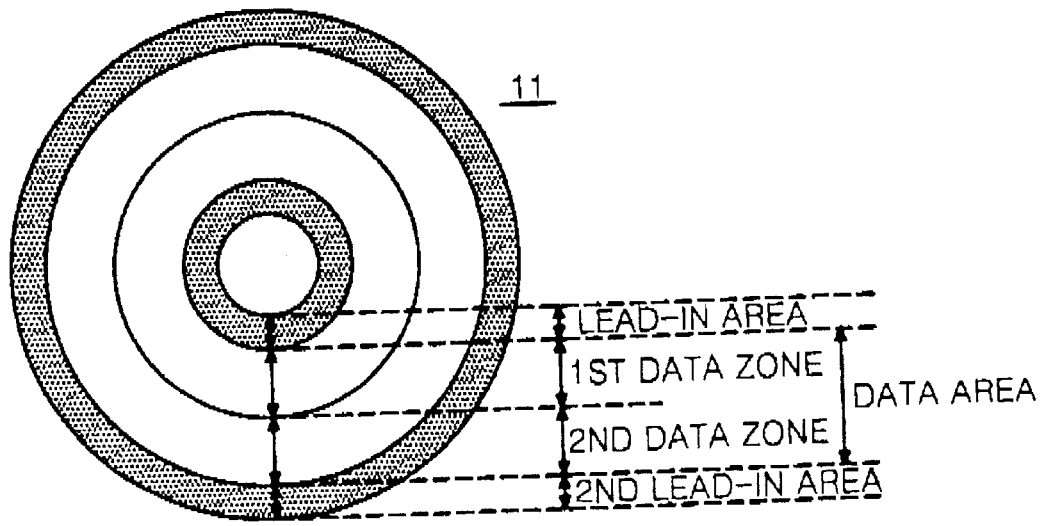
FIG. 6 is a plan view of another embodiment of the optical disc shown in FIG. 3.

FIG. 5 and FIG. 6 are plan views depicting optical discs according to embodiments of the present invention. Referring to FIG. 5, the present optical disc 11 includes a lead-in area arranged at the innermost circumference thereof, and a data area arranged between the lead-in area and the outermost circumference thereof. A disc management information such as a position information, etc. is written into the lead-in area. By referring to this management information, the optical disc apparatus of the present invention accesses a desired position on the optical disc 11 to record or reproduce data on or from the corresponding position. The data area is divided into a first data area adjacent to the lead-in area and a second data area arranged between the first data area and the outermost circumference end of the optical disc 11. The entire data area including the first and second data areas is accessible by the optical disc apparatus installed at the conventional fixed-type information equipment. The first data area also is accessible by the optical disc apparatus of FIG. 3 recording and reproducing data only in the fine search mode. In other words, the portable optical disc apparatus accesses only the first data area that can be retrieved in the fine search mode according to one embodiment of the present invention.

Alternatively, the present optical disc apparatus may access only the second data area rather than the first data area. In this case, since the lead-in area referred by the optical disc apparatus exists in a distant position beyond an accessible search range, an access to the second data area may not be realized. To this end, the present optical disc 11 may have a lead-in area arranged in such a manner to co-exist between the innermost circumference and the outermost circumference thereof as shown in FIG. 6 according to another embodiment of the present invention. An identification code indicating a start of the corresponding area can be inserted in the vicinity of the start position of the second data area. If the second lead-in area is arranged at the outermost circumference of the disc as shown in FIG. 6, then the present optical disc apparatus can refer to the second lead-in area to read out the management information when it accesses the second data area. Herein, a management information required for accessing only the second data area can be written into the second lead-in area. Otherwise, all the management information required for accessing the entire data area including the first and second data areas may be written into the second lead-in area similar to the first lead-in area.

Figure 7:
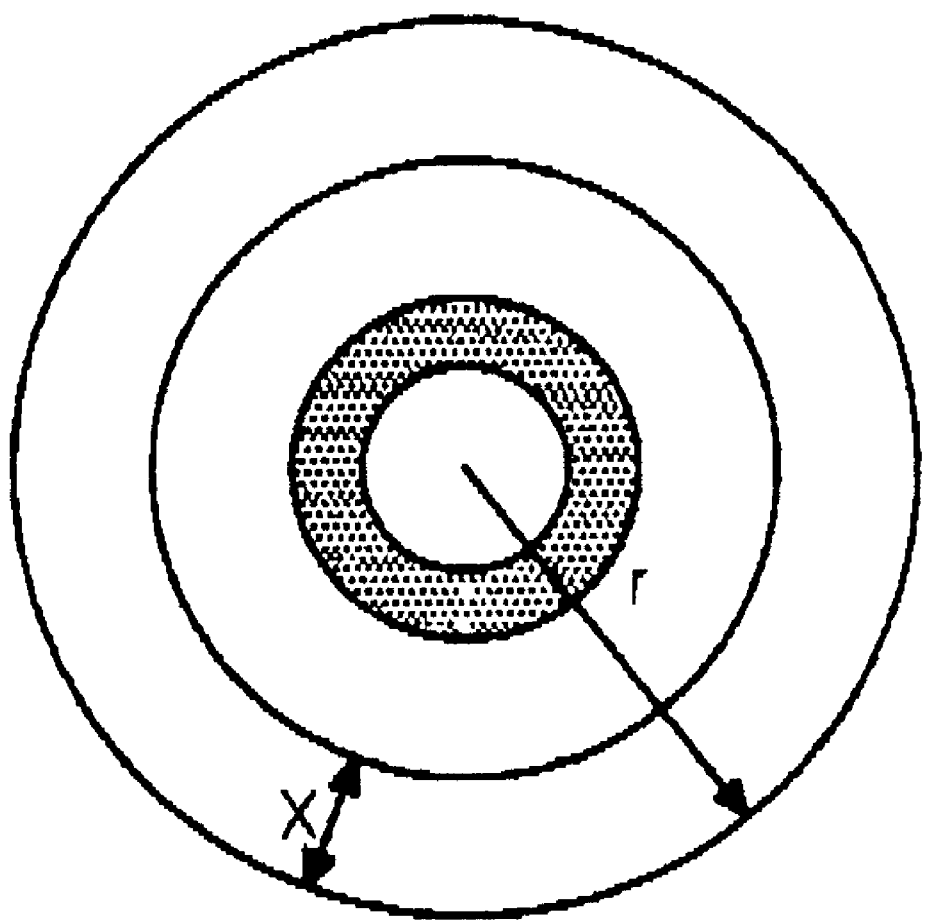
FIG. 7 is a plan view for explaining a data capacity that can be recorded on a specific radius range area in the optical disc accessed by the optical disc apparatus shown in FIG. 3.

A data capacity stored in an area within a specific radius range of the optical disc 11 accessible by the present portable optical disc apparatus can be calculated as described below. Referring to FIG. 7, it is assumed that the optical disc 11 is an improved MSR-CAD (magnetic super resolution-center aperture detection) disc which is one of a magneto-optical disc, and that a radius r thereof is 25 mm and a width X at a specific radius range zone thereof is 4 mm. An area A of the specific radius range zone X is determined by the following equation:

$$A = \pi r^2 - \pi(r-X)^2 = 2\pi X - \pi X^2 \quad (1)$$

From the equation (1), when r and X are replaced by 25 mm and 4 mm, respectively, the area A of X becomes 579 mm$^2$ (0.89 in$^2$). Since a maximum recording capacity of the improved MSR-CAD disc is 9 Gbit/in$^2$, a maximum recording capacity that can be stored in the specific radius range zone X reaches 1.0 Gbits (0.89 in$^2 \times$ 9 Gbits/in$^2$). Accordingly, a video data corresponding to more than 30 minutes can recorded within the specific radius range zone although it depends upon a resolution.

As described above, according to the present invention, the optical pickup is secured onto the case to access the optical disc, thereby eliminating the need for the optical pickup transfer devices and the sled base. Accordingly, a vibration of the optical pickup transfer devices and the sled base themselves or an external interference and a vibration transferred from the exterior into the optical pickup by means of the optical pickup transfer devices and the sled base is minimized, a stable recording and reproduction can be not only made, but also the optical disc apparatus can be made into a slim-type apparatus to such an extent that the optical pickup transfer devices and the sled base are eliminated from the optical disc apparatus. In addition, the portable optical disc apparatus has a management information area (i.e., lead-in area) for a data area within a limited specific radius range arranged in the vicinity of the data area within the specific radius range, so that it is adaptive for an optical disc apparatus accessing only the data area within the specific radius range.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A portable optical disc apparatus comprising:
   a base;
   a pickup for accessing an optical disc, and including a movable member; and
   control means for controlling the pickup in accordance with a recording/reproduction condition, wherein the pickup is secured onto the base, the movable member in the pickup is operated to access only an area within a specific radius range zone of the optical disc, and the apparatus is without an optical pickup transfer device.

2. The portable optical disc apparatus as claimed in claim 1, wherein the optical pickup is unable to access a radius range zone other than the specific radius range zone of the optical disc.

3. The portable optical disc apparatus as claimed in claim 1, wherein the movable member is an actuator for driving an objective lens of the pickup.

4. The portable optical disc apparatus as claimed in claim 1, wherein the pickup is secured directly onto the inner side of the base of a case.

5. The portable optical disc apparatus as claimed in claim 4, further comprising:
   a spindle motor for controlling the optical disc and being secured onto the inner side of the case.

6. The portable optical disc apparatus as claimed in claim 1, wherein a data area of the optical disc is divided into at least two zones, and an identification information for the divided data area is provided for any one side of the outermost circumference and the innermost circumference of the optical disc.

7. The portable optical disc apparatus as claimed in claim 6, wherein the data area includes a first data zone arranged from the inner circumference until the outer circumference of the optical disc, and a second data zone assigned to a partial area within the first data area; and the optical disc apparatus accesses only the second data zone.

8. The portable optical disc apparatus as claimed in claim 6, wherein the identification information is written into the innermost circumference and the outermost circumference of the optical disc.

9. An optical disc wherein it has a certain diameter and a data area thereof divided into at least two zones so that it is accessible by optical disc apparatuses having different accessible radius ranges, and is provided with an identification information for the divided data area, and wherein one zone of the data area is accessible by both a thin-type optical disc apparatus and a non-thin-type optical disc apparatus, and the other zone of the data area is not accessible by the thin-type optical disc apparatus, where the thin-type optical disc apparatus is without an optical pickup transfer device.

10. The optical disc as claimed in claim 9, wherein the data area includes a first data zone arranged from the inner circumference until the outer circumference of the optical disc, and a second data zone assigned to a partial area within the first data area.

11. The optical disc as claimed in claim 10, wherein the second data zone is accessed by means of both an optical disc apparatus capable of accessing only a partial data area of the optical disc and an optical disc apparatus capable of accessing the entire data area of the optical disc.

12. The optical disc as claimed in claim 10, wherein the second data zone is assigned to any one of the inner circumference side and the outer circumference side in the data area of the optical disc.

13. The optical disc as claimed in claim 9, wherein the identification information is written into any one of the innermost circumference side and the outermost circumference side of the optical disc.

14. The optical disc as claimed in claim 9, wherein the identification information is written into both the innermost circumference side and the outermost circumference side of the optical disc.

15. A portable optical disc apparatus comprising:
    a case;
    a spindle motor for rotating an optical disc, the spindle motor being fixed to the case; and
    a pick up for accessing only a specific area of the optical disc, the pick up being secured to the case and being immovable within the case,
    wherein the specific area corresponds a fine search zone.

16. The portable optical disc apparatus as claimed in claim 1, further comprising:
    a case having the base and containing the pickup and the control means without the optical pickup transfer device.

17. The portable optical disc apparatus as claimed in claim 1, wherein the pickup further includes reading/writing means movable within the pickup while a body of the pickup is fixed to the base and immovable.

18. The optical disc as claimed in claim 9, wherein the disc includes only an inner lead-in area, and not any outer lead-in area.

19. The optical disc as claimed in claim 9, wherein said one zone is an inner zone of the data area, and said the other zone is an outer zone of the data area.

20. The portable optical disc apparatus as claimed in claim 15, wherein the case contains the pickup, but is without an optical pickup transfer device.

21. The portable optical disc apparatus as claimed in claim 15, wherein the pickup includes reading/writing means movable within the pickup, while a body of the pickup is immovable within the case.

* * * * *